R. Chandler,
Band Pulley.

Nº 53,730. Patented Apr. 3, 1866.

Attest:
C. A. Blake
J. C. Fuller

Inventor:
R. Chandler
by his attorney J. B. Gardiner

UNITED STATES PATENT OFFICE.

RUFUS CHANDLER, OF SPRINGFIELD, MASSACHUSETTS, ASSIGNOR TO HIMSELF AND M. S. MAY, OF MILFORD, MASSACHUSETTS.

IMPROVEMENT IN CLAMP-PULLEYS.

Specification forming part of Letters Patent No. 53,730, dated April 3, 1866.

*To all whom it may concern:*

Be it known that I, RUFUS CHANDLER, of Springfield, Hampden county, Commonwealth of Massachusetts, have invented a new and Improved Clamp-Pulley; and I do hereby declare that the following is a full and exact description thereof, reference being had to the accompanying drawings, and to letters of reference marked thereon.

This invention consists of an improvement in that kind of pulley which is formed in two parts and united over the shaft without removing the latter from its place, and also of an improvement in the method of attaching the same to the shaft so that it may not turn on it.

Figure 1:
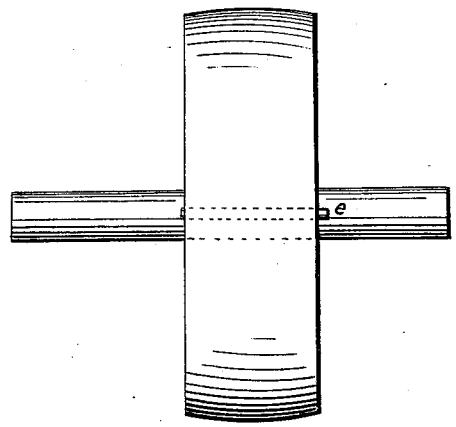
Figure 2:
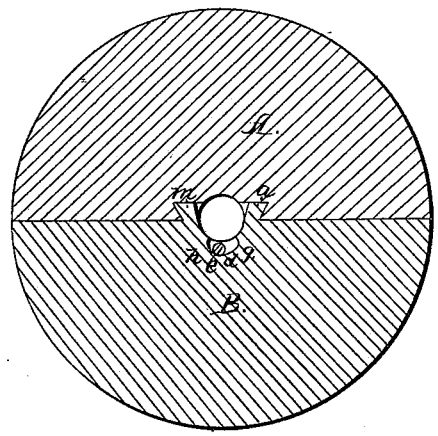
Figure 3:
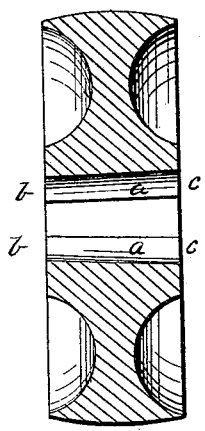
Figure 4:
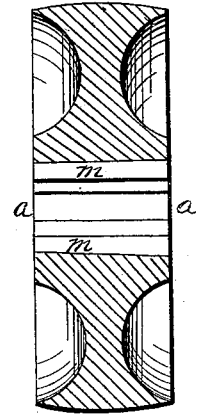

In the drawings, Figure 1 is an edge view of my improved pulley on the shaft. Fig. 2 is a cross-section of the same. Figs. 3 and 4 are views of the two parts of the pulley, showing the manner of uniting the same.

In construction this invention consists of a pulley made in two parts, A B, the part A having a dovetail groove, $a$, cut in it at the center. This groove is also narrower at $b$ $b'$ than at $c'$ $c'$, and the part B has a corresponding projection which fits in this groove, so that when the parts are placed over the shaft and the projection $m$ in B inserted in the groove in A and the two parts slid together, the pulley is held securely and with no appearance of a joint.

To fasten the pulley thus formed so that it may not turn on the shaft, I cut in one of the parts A or B a groove, $d$, in which I place a small roll, $e$, which impinges against the shaft and bottom of the groove. This groove is formed of less depth at one side, $g$, than the other, $h$, and the friction of the shaft on the roll causes the latter to be forced up into this shallow part of the groove when the shaft is turned, thus preventing the pulley from turning on the shaft in one direction, while it is free to turn in the other.

The ease and quickness with which these pulleys may be placed on a shaft already in its place, cheapness of manufacture, and durability, may readily be seen from this description, forming numerous advantages over the ordinary clamp-pulley fastened together by bolts or screws.

Now, having described my invention, what I claim as new, and desire to secure by Letters Patent, is—

A clamp-pulley having sections A and B, with dovetail connections therewith, as described, and a roll, $e$, all constructed, combined, and arranged substantially as herein specified.

RUFUS CHANDLER.

Witnesses:
 J. B. GARDNER,
 J. E. FULLER,
 H. CUTLER.